Dec. 3, 1929.　　　　E. L. MOODY　　　　1,738,385
SAFETY DEVICE FOR SUBMARINES
Filed July 25, 1928　　　2 Sheets-Sheet 2

E. L. Moody,
INVENTOR
BY Victor J. Evans
ATTORNEY

Patented Dec. 3, 1929

1,738,385

UNITED STATES PATENT OFFICE

EARNEST L. MOODY, OF WICHITA FALLS, TEXAS

SAFETY DEVICE FOR SUBMARINES

Application filed July 25, 1928. Serial No. 295,176.

My present invention has reference to a safety device or appliance for submarine vessels.

My primary object is the provision on a submarine vessel of a device, which in the event of the sinking of the vessel will release and buoy to the surface of the water a hollow float to which is attached pipes, two of which projecting entirely through the float and having their ends closed by fuses, all of the pipes being connected to suitable hose that are directed into the vessel and that are valve controlled and are designed to be connected to suitable pumps, one of which operating to fill the float with air to add to the buoyancy thereof, another serving to force air through one hose of the pipe attached thereto to blow out the fuse to allow air to pass through this pipe and tube, the regulation of the valve in the vessel preventing the entrance of water into the said vessel should the float not have reached the surface of the water, the pump for the remaining hose forcing air through the pipe associated therewith for blowing out the fuse on the end thereof, and whereby fresh air may be introduced into the vessel and foul air forced therefrom to prolong the lives of the occupants of the sunken submarine, the float also serving as a signal means whereby other vessels may locate the disabled vessel and raise the same to the surface of the water and rescue the crew therefrom.

The invention will be fully and comprehensively understood from a consideration of the following detailed description when read in connection with the accompanying drawings which form part of the application, with the understanding, however, that the improvement is capable of extended application and is not confined to the exact showing of the drawings nor to the precise construction described and, therefore, such changes and modifications may be made therefrom as do not affect the spirit of the invention nor exceed the scope thereof as expressed in the appended claim.

Figure 1:
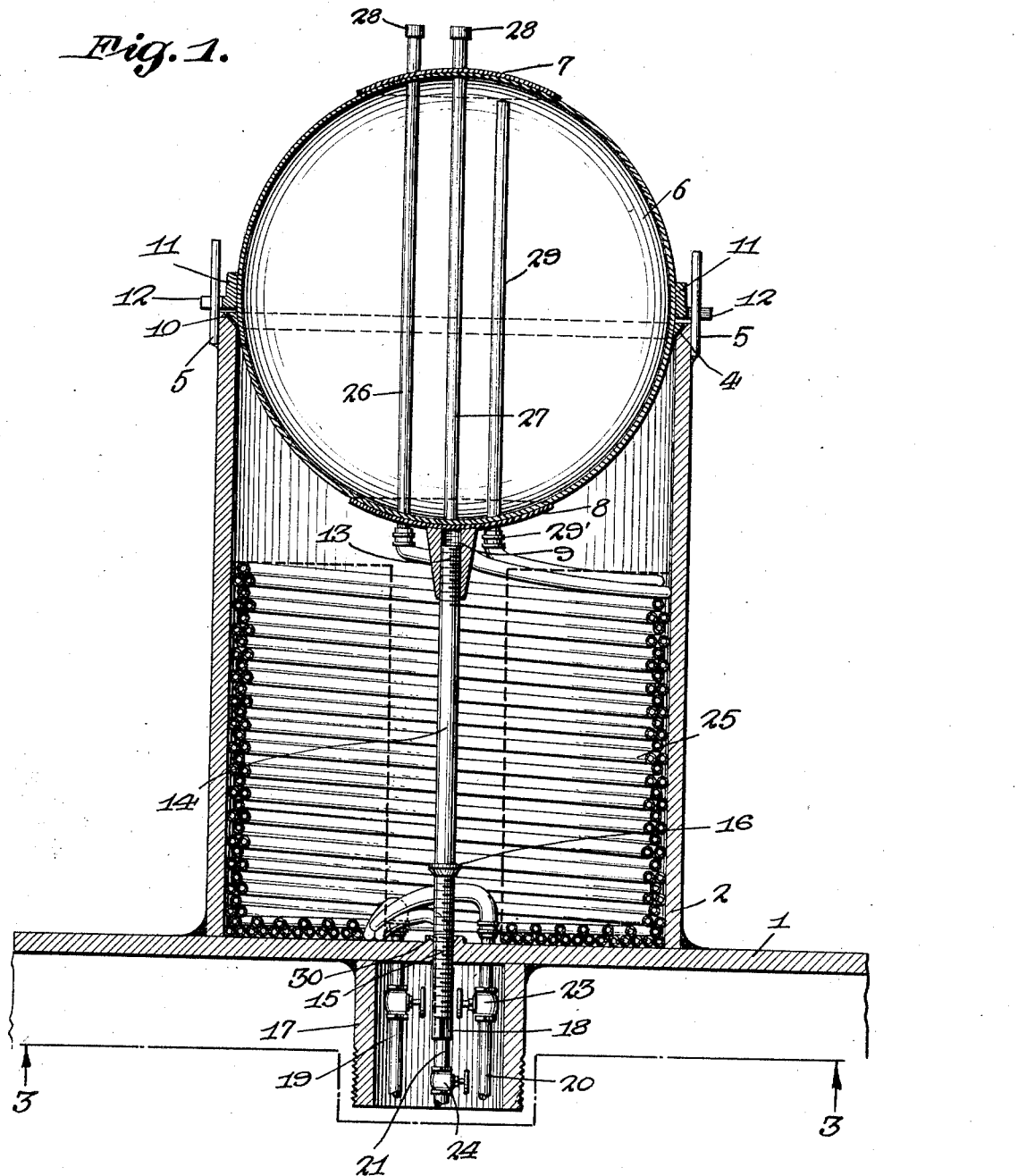
Figure 1 is a substantially central vertical longitudinal sectional view through my improvement secured to the shell of a submarine.
Figure 2:
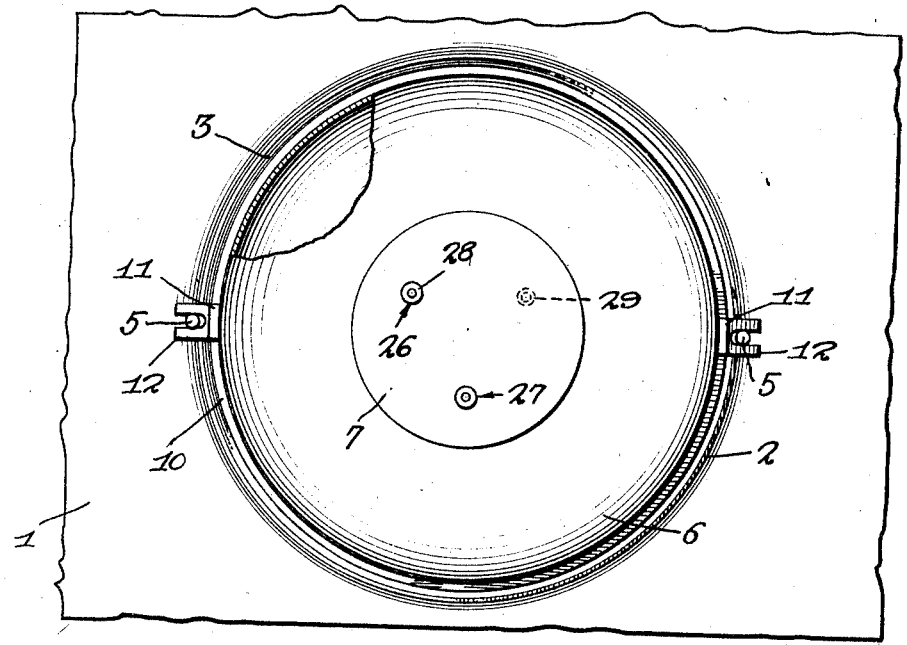
Figure 2 is a top plan view thereof.
Figure 3:
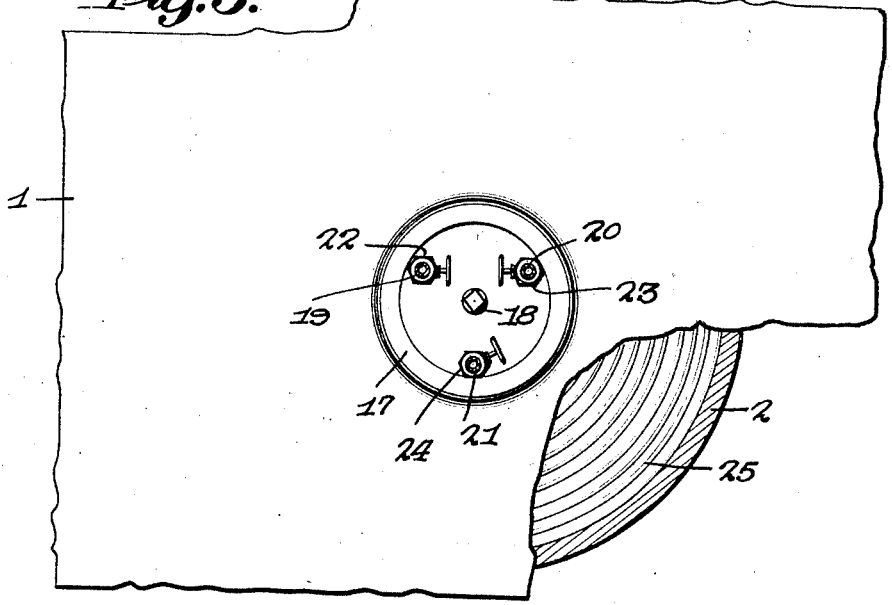
Figure 3 is a sectional view approximately on the line 3—3 of Figure 1, with parts of the shell of the vessel broken away to show the manner in which the hose are coiled in the cylinder.

At a convenient point on the top of the shell 1 of a submarine vessel I weld the lower end of a cylinder 2. The cylinder may be welded from both the inner and outer surfaces thereof in order to render a strong connection between the same and the vessel. The cylinder is of a desired length and has its mouth flared and beveled inwardly, as at 3, and in this mouth there is an annular depression for a gasket 4. The cylinder, at its said top has on its outer face oppositely disposed upstanding rods 5 which are also securely welded to the cylinder.

The top or mouth of the cylinder is designed to receive therein the spherical float or buoy 6 that constitutes an important element of the improvement. The float or buoy is constructed of thin but strong metal and preferably comprises two sections which are effectively welded together to insure a water tight joint therebetween. The hollow sphere 6, at its top is centrally provided with a reinforcing plate in the nature of a concaved disc 7 and upon its lower face at its center with a similar disc 8, both the discs 7 and 8 being welded to the sphere and thereby materially reinforcing the said sphere. The reinforcing plate or disc 8 is either centrally formed with or has securely welded thereon a depending socket member 9 whose bore is threaded. This socket member, in addition to performing an important function which will presently be described, also with the disc 8 adds to the weight of the bottom of the hollow sphere, so that the same, when released from the cylinder 2 will be buoyed in a substantially vertical direction through the water.

The spherical float 6 has centrally welded therearound a ring 10, the lower corner or outer face of the ring being beveled to contact with the beveled mouth of the cylinder 2. The metal cylinder and ring afford a ground and water tight joint therebetween. The packing 4 materially aids in producing such type of joint.

On two of the sides of the hollow spherical float 6 there are welded substantially L-shaped brackets 11, the outer or horizontal arms 12 of the said brackets being bifurcated and receive therein the rods 5 on the cylinder 2.

Screwed in the socket 9 there is the threaded end 13 of a rod or bolt 14. This rod 14 has its lower end threaded, as at 15, the said threads being comparatively fine and pass through an opening in the shell 1, in a line with the axial center of the cylinder 2 and the float 6. If desired, the threaded end 15 of the rod 14 may also pass through a packing box to more effectively insure a water tight joint between the rod and opening through which it passes. The rod at a distance above the shell 1 approximately equalling the length of the threads 15 thereon is formed with an annular enlargement 16, and this enlargement is designed to contact with the outer face of the shell 1 when the rod 14 is turned to bring its threaded end 13 out of the socket 9 and thereby release the float 6 from its engagement with the mouth of the cylinder 2. The enlargement when thus contacting with the shell serves as a further means for preventing the seepage of water between the threaded end 15 of the rod 14 and the opening of the shell through which the said end of the rod passes.

Welded to the inner face of the shell 1 and disposed centrally with respect to the cylinder 2, there is a tubular member 17 that provides what I will term a compartment and in this compartment the threaded end 15 of the rod is centrally received. The end of the rod 14 in the compartment 17 is squared or otherwise provided with angle facets 18 for the reception of a socket or other wrench. In the compartment 17 there are three spaced pipe members 19, 20, and 21, and the passages through all of these pipes are controlled by hand operated valves 22, 23 and 24, respectively. The pipe members 19, 20 and 21, pass through suitable openings in the shell 1 and are welded in such openings to insure a water tight joint. The ends of the pipes which extend into the lower portion of the cylinder 2 are provided with suitable couplings whereby a flexible hose is connected to each of the said pipes. The couplings are of a rigid nature to positively insure the proper association of the tubes 25—25 with the respective pipes. These tubes 25 are neatly coiled in the cylinder, and are so arranged that the same may be pulled outwardly of the cylinder without one of the tubes interfering with the other. Passing vertically through and welded to the shell of the spherical plate 6 there are spaced pipes 26 and 27. The lower ends of these pipes which project through the bottom of the float have securely coupled thereto two of the hose 25. The pipes project a suitable distance above the top of the float and have screwed therein, and also preferably welded thereto flanged caps 28, respectively. Each cap has its outer face provided with an opening, and in these openings there are securely fixed fuses 29, respectively.

The fuses may be of any desired material to insure a water tight joint through the pipes 26 and 27.

Passing through the bottom of the spherical float 6, welded thereto and terminating a slight distance above the reinforced top thereof there is a vertically disposed pipe 29. This pipe has its end which projects through the float securely coupled to the remaining tube 25.

Should the submarine craft 1 become disabled and sink, one of the crew will apply a wrench to the head 18 of what I have termed the rod 14, so as to uncouple the said rod from the socket 9 of the float. The threads 13 are spaced a greater distance apart than the threads 15 of the said rod 14, and when the threaded end 13 of the rod leaves the socket 9, the flared enlargement 16 will be received on the outer face of the shell 1 and preferably in a cup-shaped pocket 30 therefor. One of the operators now attaches a suitable hose to the pipe 21 which has a hose connection 25 with the pipe 29' in the float 6, and the air thus forced into the float will add to the buoyancy thereof. The same or a second occupant of the craft will attach an oxygen or air hose to either one of the pipes 19 or 20 and after the crew have determined that the float has reached the surface of the water, the pressure through this pipe and through either one of the pipes 26 and 27 will blow the fuse 29 out of the cap 28. The operator has his hand upon the handle portion of either the valves 22 or 23 and should water return through either one of the pipes 19 or 20 he will shut off the valve and by continuously shutting off and opening the valve he will readily determine when the float has reached the surface of the water.

A second pump is then attached to the remaining pipe 19 or 20 to blow out the fuse in the caps of either of the pipes 26 or 27 and by working the pumps fresh air can be forced into the vessel and foul air forced therefrom. The elements constituting the improvement are comparatively small and the tubular compartment 17 has a threaded end which may be closed by a cap when the hose from the pumps attached to the caps 19, 20 and 21 are detached therefrom. It should have been stated that when the spherical float is filled with air the valve 27 is shut off and likewise that great lengths of hose may be compactly wound or coiled in a neat condition in the cylinder 2. With my improvement the disabled or sunken craft is not only provided with a continuous supply of fresh air and foul air forced therefrom but the spherical buoy riding on the surface of the water will attract attention to crafts so that the sunken vessel may be readily located and raised to the surface of the water without any liability of the crew in the craft becoming suffocated from lack of air. In addition to this food of a liquid nature may be forced through either of the pipes 26 or 27 into the sunken craft to insure the survival of the crew until rescued.

Having described the invention, I claim:

The combination with a submarine craft, of a cylinder on and welded to the top plate thereof, said cylinder having its mouth inwardly flared and provided with an annular depression for a gasket, and a hollow float having a ring member welded thereon and surrounding the same and flared to engage with the flared mouth of the cylinder and with the gasket, slotted brackets on the float, pins welded on the cylinder and passing through the slots in the brackets, reinforcing plates on the top and bottom of the float, a socket centrally depending from the float, a rod member having threaded ends, one of which is screwed in the socket and the other is screwed through the top plate of the submarine, and the inner end of the said rod being squared, a flanged stop element on the rod, a cup-shaped member on the outer face of the submarine to receive said stop therein when the rod is unscrewed from the socket, a tubular compartment welded to the inner face of the top plate of the submarine, in a line with the center of the cylinder and providing a compartment, a plurality of pipes in the pocket passing through and welded to the top plate of the submarine and received in the cylinder, a hand controlled valve for each of said pipes and said pipes adapted to be attached to air pumps, a hose coupled to each pipe coiled in the cylinder, a plurality of vertically arranged pipes entering the float, welded thereto and coupled to the respective hose, two of said pipes extending through the top and welded to the float, a cap member screwed and welded on the ends of the last mentioned pipes, each of said cap members having an opening therethrough and a fuse closing such opening, for the purpose set forth.

In testimony whereof I affix my signature.

EARNEST L. MOODY.